US012775176B2

(12) United States Patent
Watanabe et al.

(10) Patent No.: US 12,775,176 B2
(45) Date of Patent: Oct. 27, 2026

(54) AIR FLOATING VIDEO DISPLAY APPARATUS COMPRISING A RETRO-TRANSMITTING PLATE HAVING A SLIT MIRROR ARRAY

(71) Applicant: MAXELL, LTD., Kyoto (JP)

(72) Inventors: Toshimitsu Watanabe, Kyoto (JP); Sho Asakura, Kyoto (JP)

(73) Assignee: MAXELL, LTD., Kyoto (JP)

( * ) Notice: Subject to any disclaimer, the term of this patent is extended or adjusted under 35 U.S.C. 154(b) by 278 days.

(21) Appl. No.: 18/381,719

(22) Filed: Oct. 19, 2023

(65) Prior Publication Data

US 2024/0142796 A1 May 2, 2024

(30) Foreign Application Priority Data

Oct. 26, 2022 (JP) ................................ 2022-171520

(51) Int. Cl.
*G02B 30/56* (2020.01)
*G02F 1/13357* (2006.01)

(52) U.S. Cl.
CPC ....... *G02B 30/56* (2020.01); *G02F 1/133606* (2013.01)

(58) Field of Classification Search
None
See application file for complete search history.

(56) References Cited

U.S. PATENT DOCUMENTS 11,592,685 B2 2/2023 Han et al.
2005/0280891 A1* 12/2005 Bogle .................. G02B 21/361 359/368
2011/0181949 A1 7/2011 Hashikawa
2012/0098941 A1* 4/2012 Joseph ................ H04N 13/363 348/51

(Continued)

FOREIGN PATENT DOCUMENTS

CN 107102475 A * 8/2017 ........... G02B 6/0058
JP 3-33458 U 4/1991

(Continued)

OTHER PUBLICATIONS

Japanese Office Action received in corresponding Japanese Application No. 2022-171520 dated Jul. 21, 2026.

*Primary Examiner* — Paul C Lee
(74) *Attorney, Agent, or Firm* — MATTINGLY & MALUR, PC

(57) ABSTRACT

A more favorable air floating video display apparatus is provided. This technique contributes to the Sustainable Development Goals that are “the third goal: Good Health and Well-being (for all people)”, “the ninth goal: Industry, Innovation and Infrastructure” and “the eleventh goal: Sustainable Cities and Communities”. The air floating video display apparatus includes: a video display; and a retro-transmitting plate transmitting video light emitted from the video display to form an air floating video, a light path length of video light having been emitted from a display surface of the video display through the retro-transmitting (Continued)

plate to a position of the air floating video changes depending on a position on the display surface of the video display from which the video light is emitted, and the video display is configured to change a light emission amount per unit area to depend on the light path length.

7 Claims, 11 Drawing Sheets

(56) References Cited

U.S. PATENT DOCUMENTS

2023/0004001 A1* 1/2023 Sulyok ............... G02B 27/0101

FOREIGN PATENT DOCUMENTS

| | | | |
|---|---|---|---|
| JP | 2009-224138 | W | 10/2009 |
| JP | 2012-150891 | W | 8/2012 |
| JP | 2012-177922 | A | 9/2012 |
| JP | 2012-204217 | W | 10/2012 |
| JP | 2021-184077 | W | 12/2021 |
| WO | 2017/221812 | W | 12/2017 |

* cited by examiner

AIR FLOATING VIDEO DISPLAY APPARATUS COMPRISING A RETRO-TRANSMITTING PLATE HAVING A SLIT MIRROR ARRAY

CROSS-REFERENCE TO RELATED APPLICATION

The present application claims priority from Japanese Patent Application No. 2022-171520 filed on Oct. 26, 2022, the content of which is hereby incorporated by reference into this application.

TECHNICAL FIELD OF THE INVENTION

The present invention relates to an air floating video display apparatus.

BACKGROUND OF THE INVENTION

As disclosed in, for example, Japanese Patent Application Laid-Open Publication No. 2012-177922 (Patent Document 1), a technique for an air floating video display apparatus can display an aerial video as a real image since the display apparatus includes a light reflecting optical element consist of a structure including matrix-arranged small mirror units having first and second light reflecting surfaces.

RELATED ART DOCUMENT

Patent Document

Patent Document 1: Japanese Patent Application Laid-Open Publication No. 2012-177922

SUMMARY OF THE INVENTION

However, the Patent Document 1 discloses that, if a display position of the aerial video is different, a total light amount taken into a light transmitting surface is different, and therefore, brightness viewed by an observer changes depending on the display position, and a user feels strongly uncomfortable. The present invention has been made in consideration of such circumstances, and an objective of the present invention is to provide a more favorable air floating video display apparatus.

In order to solve the problem, an embodiment of the present invention includes, for example, a video display and a retro-transmitting plate transmitting video light emitted from the video display to form an air floating video, a light path length of video light having been emitted from a display surface of the video display through the retro-transmitting plate to a position of the air floating video changes depending on a position on the display surface of the video display from which the video light is emitted, and the video display is configured to change a light emission amount per unit area in accordance with the light path length.

According to the present invention, a better air floating video display apparatus can be achieved.

BRIEF DESCRIPTIONS OF THE DRAWINGS

DESCRIPTIONS OF THE PREFERRED EMBODIMENTS

Hereinafter, embodiments of the present invention will be described in detail, based on the accompanying drawings. Note that the present invention is not limited to the explanation for the embodiments, and various modifications and alterations can be made by those who skilled in the art within the scope of the technical idea of the present invention disclosed in the present specification. And, components having the same function are denoted by the same reference signs throughout all the drawings for describing the embodiments, and the repetitive description thereof will be omitted.

In the following explanation for the embodiments, the floating video in air is expressed as a term “air floating video”. In place of this term, this may be expressed as “air image”, “aerial image”, “aerial floating video”, “aerial floating optical image of display video”, “air floating optical image of display video”, or others. The term “air floating video” mainly used in the explanation for the embodiments is used as a typical example of these terms.

Figure 1:
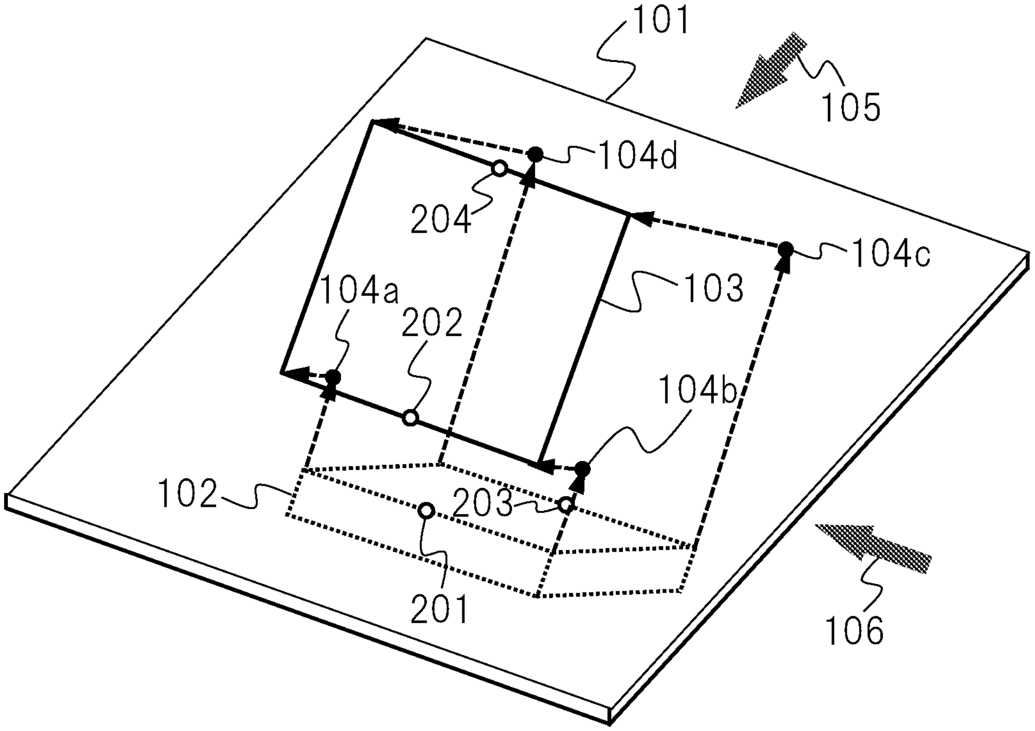
FIG. 1 is a configurational diagram of an air floating video display apparatus according to an embodiment of the present invention.

FIG. 1 is a diagram showing an entire configuration of an air floating video display apparatus according to an embodiment of the present invention. A specific configuration of the air floating video display apparatus is described in detail with reference to FIGS. 2, 3, 10 and 11.

The air floating video display apparatus is composed of a double-layer type retro-transmitting optical plate 101 and a video display apparatus 102, and displays an air floating image 103. The double-layer type retro-transmitting optical plate 101 may be also as retro-transmitting plate, and the video display apparatus 102 may be also referred to as video display.

The video display apparatus 102 is arranged on a back surface of the double-layer type retro-transmitting optical plate 101, and each of points 104*a*, 104*b*, 104*c* and 104*d* is a middle point between each position of four corners of the video display apparatus 102 and an imaging position corresponding to each position of four corners of the created air floating image 103, and is a point on a surface of the double-layer type retro-transmitting optical plate 101.

Each of four dotted-line arrows extending from each of the positions of the four corners of the video display apparatus 102 to the double-layer type retro-transmitting optical plate 101 represents principal ray, each of white circle positions 201 and 203 represents a light emission position of the video display apparatus 102, and each of dotted-line arrows extending from each of the points 104*a*, 104*b*, 104*c* and 104*d* to the air floating image 103 also represents principal ray. Each of white circle positions 202 and 204 represents the corresponding imaging position of the air floating image 103.

Figure 10:
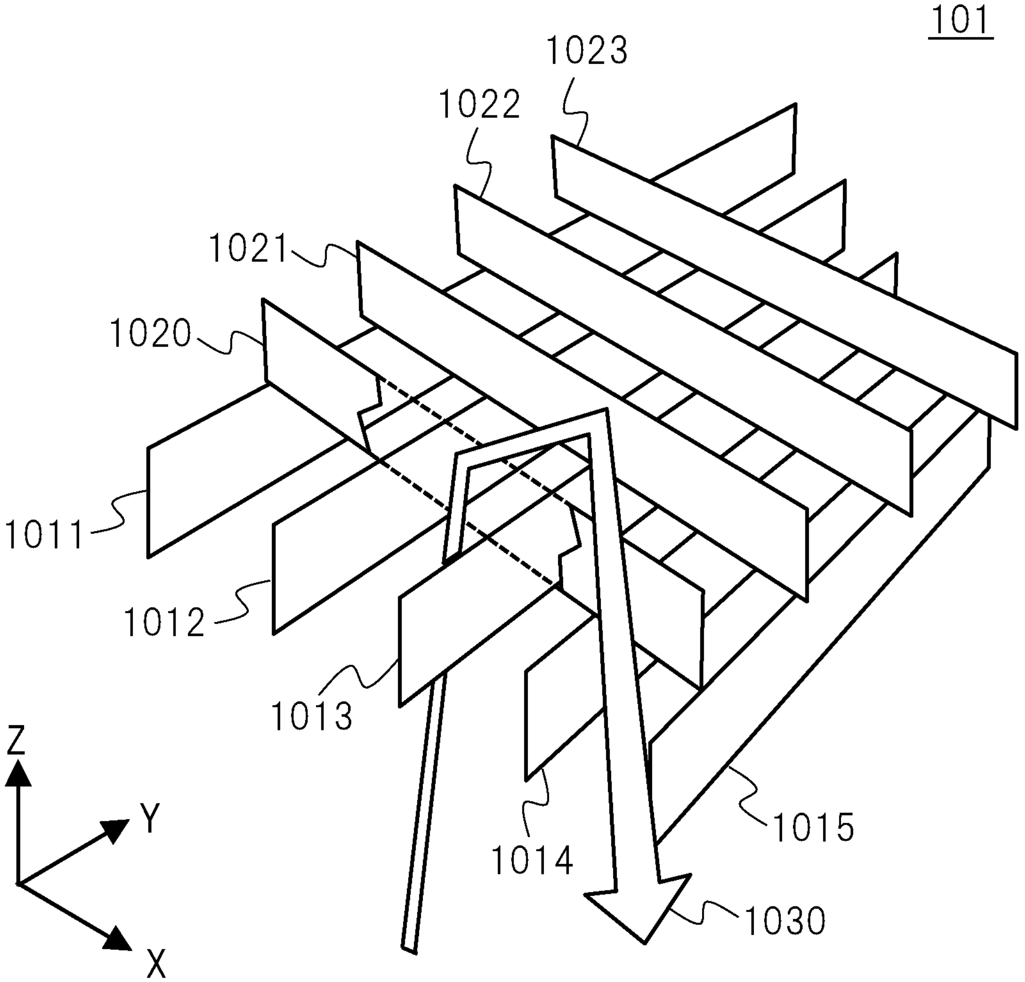
FIG. 10 is a diagram showing an optical image light path of a light reflecting optical element of the air floating video display apparatus according to the embodiment of the present invention.
Figure 11:
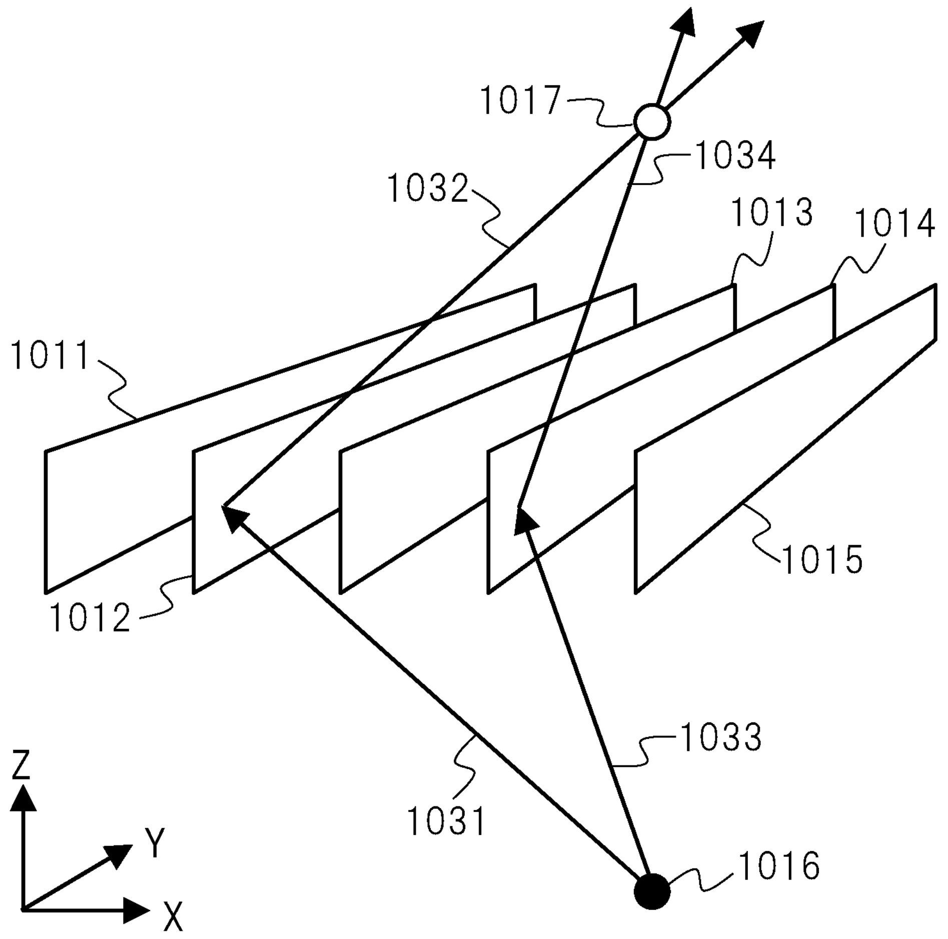
FIG. 11 is a diagram showing a composed image light path of a light reflecting optical element of the air floating video display apparatus according to the embodiment of the present invention.

An operation principle of the double-layer type retro-transmitting optical plate 101 will be explained with reference to FIGS. 10 and 11. FIG. 10 shows a part of a configuration of the double-layer type retro-transmitting optical plate 101. A mirror 1011, a mirror 1012, a mirror 1013, a mirror 1014 and a mirror 1015 are arranged so that small reflection surfaces of stripe shape are lined to configure a first slit mirror array (SMA).

A mirror 1020, a mirror 1021, a mirror 1022 and a mirror 1023 are arranged so that small reflection surfaces of stripe shape are lined to configure a second SMA. The double-layer type retro-transmitting optical plate 101 is consist of double-layer plates of the first SMA and the second SAM being orthogonal to and overlapping each other. FIG. 11 shows a light source 1016 illustrated with a black circle, a real image 1017 illustrated with a white circle, and light rays 1031, 1032, 1033 and 1034 in the first SMA for further explanation. The light ray 1031 of the plurality of light rays emitted from the light source 1016 is reflected by the mirror 1012 to become the light ray 1032, and the light ray 1033 is reflected by the mirror 1014 to become the light ray 1034.

The light ray 1032 and the light ray 1034 compose an image at a position of the real image 1017 to form the real image. As shown in FIG. 10, the double-layer type retro-transmitting optical plate 101 is consist of the double-layer plates being orthogonal to and overlapping each other, and therefore, has a retro-transmitting property "not allowing the incident light emitted from the back surface to bend in a normal line direction but allowing the incident light only to bend within a plane". This state is illustrated with the light ray 1030. The retro-transmitted light ray composes the real image at a plane-symmetrical position to the light source about the plate, and therefore, forms the real image.

Figure 2:
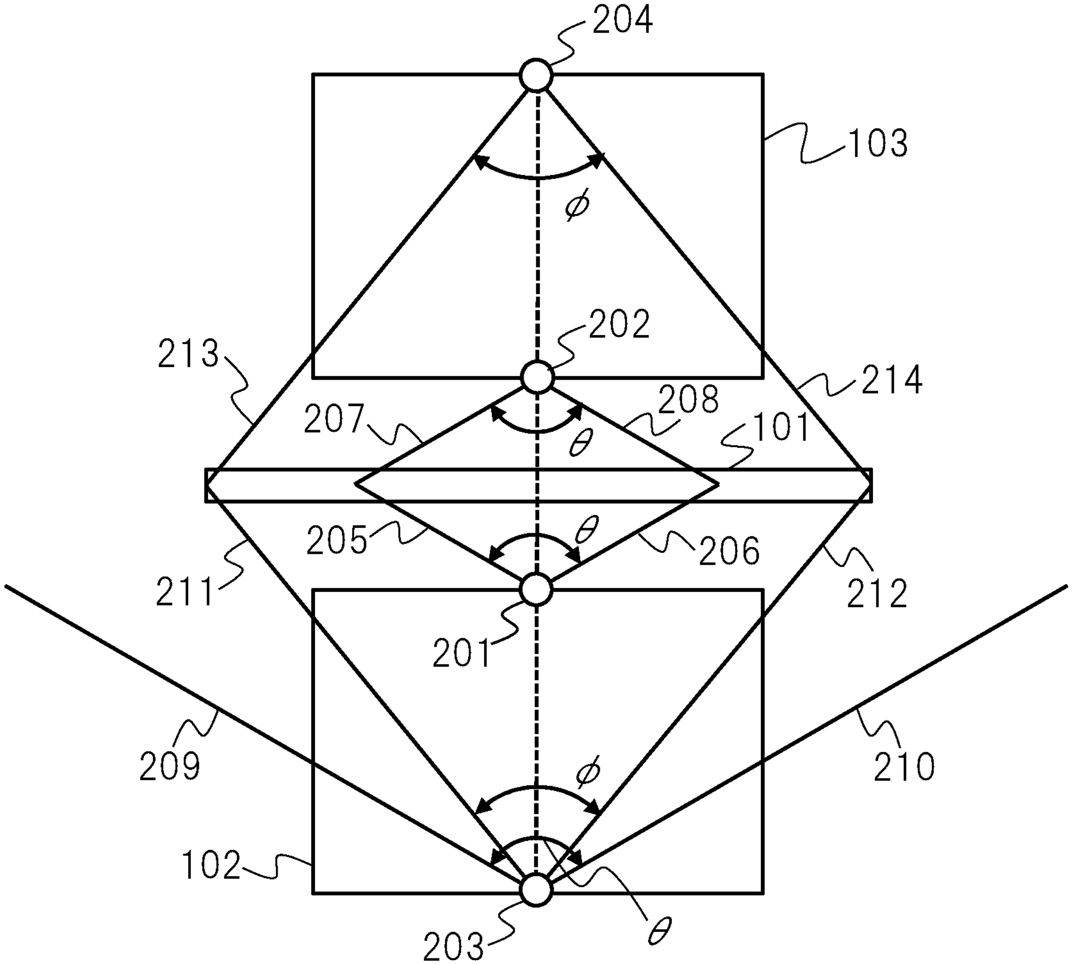
FIG. 2 is a diagram showing a composed image light path in a configurational example of the air floating video display apparatus according to the embodiment of the present invention.

A ray path diagram in a case of viewing in a direction of an arrow 105 in FIG. 1 is illustrated in FIG. 2. With reference to FIG. 2, a cause of decrease in an in-plane luminance distribution of the air floating image 103 will be explained. As a premise, light having a predetermined divergence angle θ is emitted as the light emitted from the white circle position 201. As a premise, the divergence angle θ is, for example, equivalent to a full width of half maximum luminance intensity. Incident light rays corresponding to the divergence angle θ on the double-layer type retro-transmitting optical plate 101 are illustrated as light rays 205 and 206.

In FIG. 2 described later, the light rays having been transmitted in the double-layer type retro-transmitting optical plate 101 become light rays 207 and 208 because of imaging at the plane-symmetrical positions, and compose the image at the white circle position 202. As a result, an angle between the light rays 207 and 208 is substantially θ, and loss of the emitted luminous flux hardly occurs. However, light rays 209 and 210 having the same divergence angle θ and representing the light emitted from the white circle position 203 are made incident while limiting to have an angle φ representing light rays 211 and 212 of FIG. 2 because of a size of the double-layer type retro-transmitting optical plate 101, the light rays having been transmitted in the double-layer type retroreflection optical plate 101 become light rays 213 and 214, and compose the image at the white circle position 204, and therefore, the loss of the emitted luminous flux occurs.

As a result, the luminance of the air floating image 103 decreases at the white circle position 204. If the apparatus has a function of controlling the divergence angle of the video display apparatus 102 as the means for compensating this luminance decrease, the luminance uniformity of the air floating image 103 can be improved.

In other words, a light path length of the video light having been emitted from the display surface of the video display through the retro-transmitting plate to the position of the air floating video changes depending on the position on the display surface of the video display from which the video light is emitted, a video display region of the display surface of the video display 102 is quadrangular, the video display and the retro-transmitting plate are arranged to make gradient of the light path length of the video light at a position on the display surface of the video display in a first direction that is a direction along one side of the quadrangular shape, and the video display is configured to change a light emission amount per unit area to make gradient in the direction corresponding to the first direction on the display surface of the video display. In other words, a backlight unit including the light source unit 303 and the diffusion plate 302 is configured to change the light emission amount per unit area to make gradient in the direction corresponding to the first direction on the display surface of the display panel. Examples regarding this will be described below.

Figure 3:
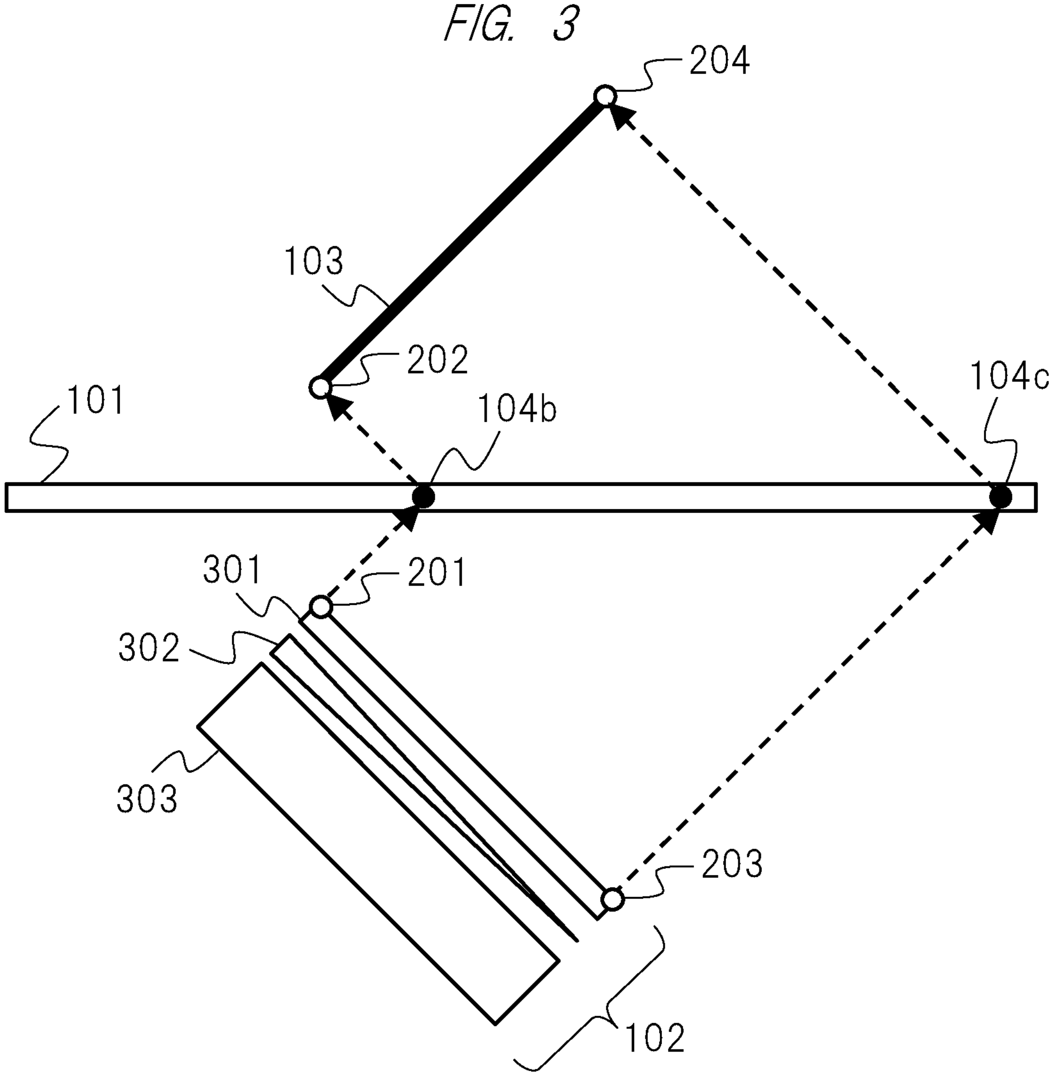
FIG. 3 is a diagram showing a configuration of some optical elements in a first example of the air floating video display apparatus according to the embodiment of the present invention.

FIG. 3 is a diagram showing a configuration in a case of viewing in a direction of an arrow 106 of FIG. 1. The video display apparatus 102 is consist of a liquid crystal display panel 301, the diffusion plate 302 and the light source unit 303. The video display area of the display surface of the liquid crystal display panel 301 in the present embodiment is quadrangular, but may not be quadrangular. The liquid crystal display panel 301 may be also referred to as display panel, and the diffusion plate 302 may be also referred to as optical element.

The display apparatus may be also referred to as backlight unit including the light source unit 303 and the diffusion plate 302. A cross-sectional shape of the diffusion plate 302 is a wedge shape that is gradually thinner as heading from the white circle position 201 toward the white circle position 203. The diffusion plate 302 has a configuration in which a light diffusing material is kneaded into a resin, and can control the light emitted from the light source unit 303 to have a predetermined divergence angle because of its thickness, and therefore, the light-source divergence angle at the white circle position 203 is narrowed by the wedge cross-sectional shape, and the luminance decrease of the air floating image 103 at the white circle position 204 can be suppressed without the loss of the light emission amount, and the luminance uniformity can be improved.

In other words, the light path length of the video light having been emitted from the display surface of the video display through the retro-transmitting plate to the position of the air floating video changes depending on the position on the display surface of the video display from which the video light is emitted, a video display region of the display surface of the liquid crystal display panel 301 is quadrangular, the video display and the retro-transmitting plate are arranged to make gradient of the light path length of the video light at a position on the display surface of the video display in a first direction that is a direction along one side of the quadrangular shape, and a thickness of the diffusion plate is changed in a direction corresponding to the first direction on the display surface of the video display. In other words, the diffusion plate 302 is configured to change the thickness of the diffusion plate 302 in the direction corresponding to the first direction on the display surface of the display panel.

Figure 4:
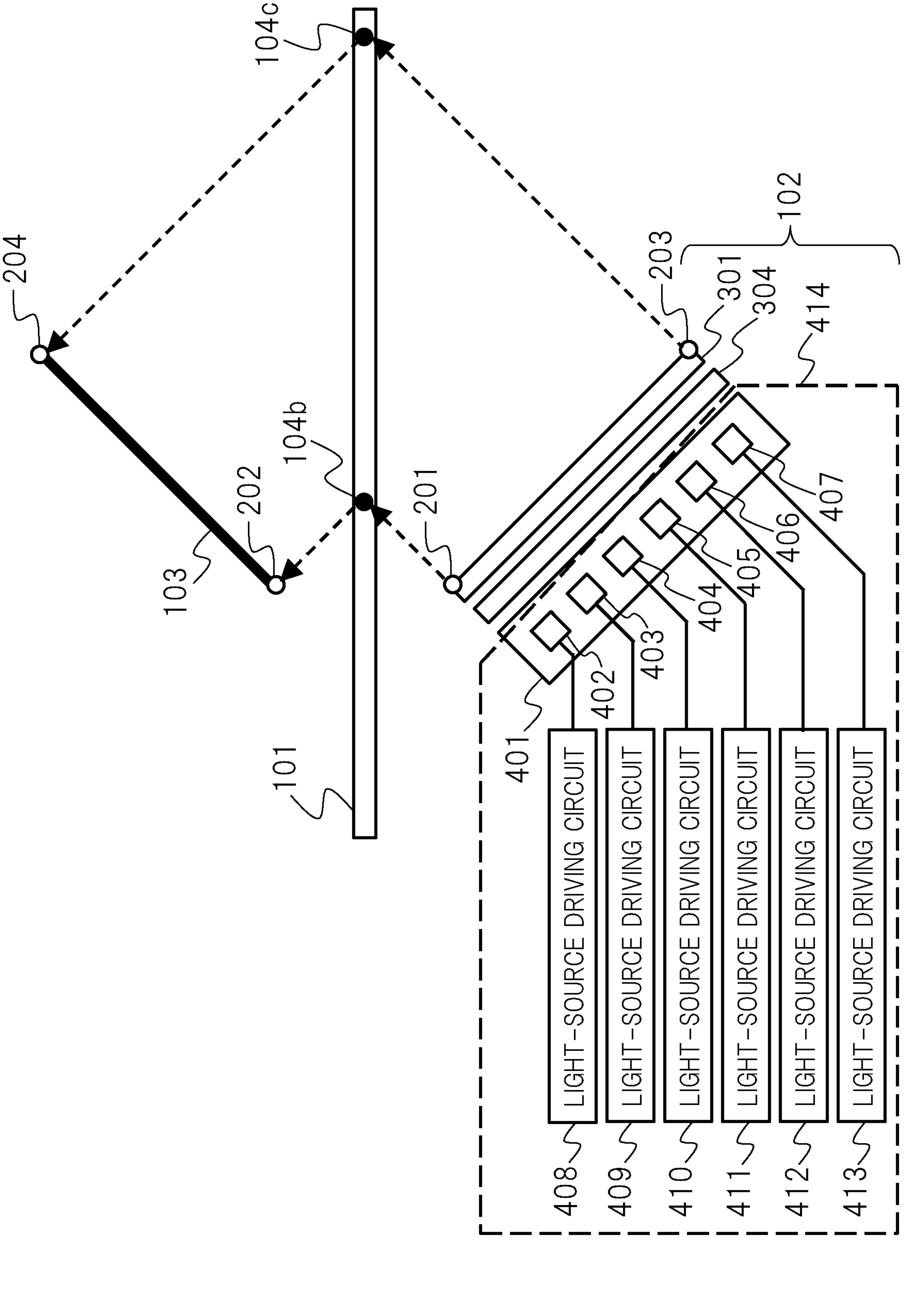
FIG. 4 is a diagram showing a configuration of a light source in a second example of the air floating video display apparatus according to the embodiment of the present invention.

FIG. 4 is a diagram showing a second example of the air floating video display apparatus according to the embodiment of the present invention. FIG. 4 is a diagram showing a configuration in the case of viewing in the direction of the arrow 106 of FIG. 1. A video display apparatus 102 is consist of the liquid crystal display panel 301, a diffusion plate 304 and a light source unit 414. The light source unit 414 is consist of a light-source optical unit 401 and light-source driving circuits 408, 409, 410, 411, 412 and 413. The light source unit 414 may be also referred to as light source. The light-source optical unit 401 is consist of LED (Light Emitting Diode) units 402, 403, 404, 405, 406 and 407, and each LED unit is connected to each light-source driving circuit. The LED unit may be also referred to as light source element or light emitting portion. The LED units 402 to 407 basically have the same configuration with one another, and one example of this configuration is illustrated in FIG. 5.

Figure 5:
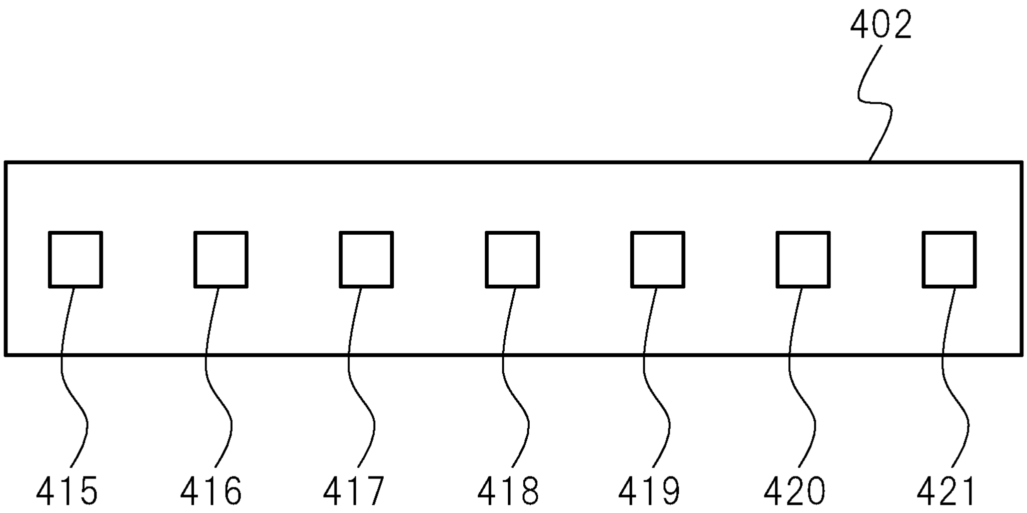
FIG. 5 is a diagram showing an LED unit in the second example of the air floating video display apparatus according to the embodiment of the present invention.

FIG. 5 shows a case of viewing of the LED unit 402 in the direction of the arrow 105 of FIG. 1, and LEDs 415, 416, 417, 418, 419, 420 and 421 are lined. Arrangement distances among the LED units are equal to one another, and the LEDs are connected in series to be driven in terms of constant current by the light-source driving circuit. The light emission amount at the white circle position 203 can be increased by adding a driving current of the light-source driving circuit 413 to a driving current of the light-source driving circuit 408 of FIG. 4, the luminance decrease of the air floating image 103 at the white circle position 204 can be suppressed, and therefore, the luminance uniformity can be improved.

In other words, the light path length of the video light having been emitted from the display surface of the video display through the retro-transmitting plate to the position of the air floating image changes depending on the position on the display surface of the video display from which the video light is emitted, a video display region of the display surface of the video display is quadrangular, the video display and the retro-transmitting plate are arranged to make gradient of the light path length of the video light at a position on the display surface of the video display in a first direction that is a direction along one side of the quadrangular shape, and the light source unit is configured to change the light emission amount per unit area to make gradient in the direction corresponding to the first direction on the display surface of the video display.

Further, the light source unit 414 is configured so that a plurality of light source elements 402 to 407 are arranged at an equal interval. Each of the light source elements 402 to 407 is configured to change the driving current of the light source element in a direction corresponding to the first direction on the display surface of the video display. In other words, the light source 414 includes the plurality of light emitting portions 402 to 407, and the light source 414 is configured to make gradient of the light emission amount per unit area in the direction corresponding to the first direction on the display surface of the display panel 301 by changing the driving currents of the plurality of light emitting portions 402 to 407.

Figure 6:
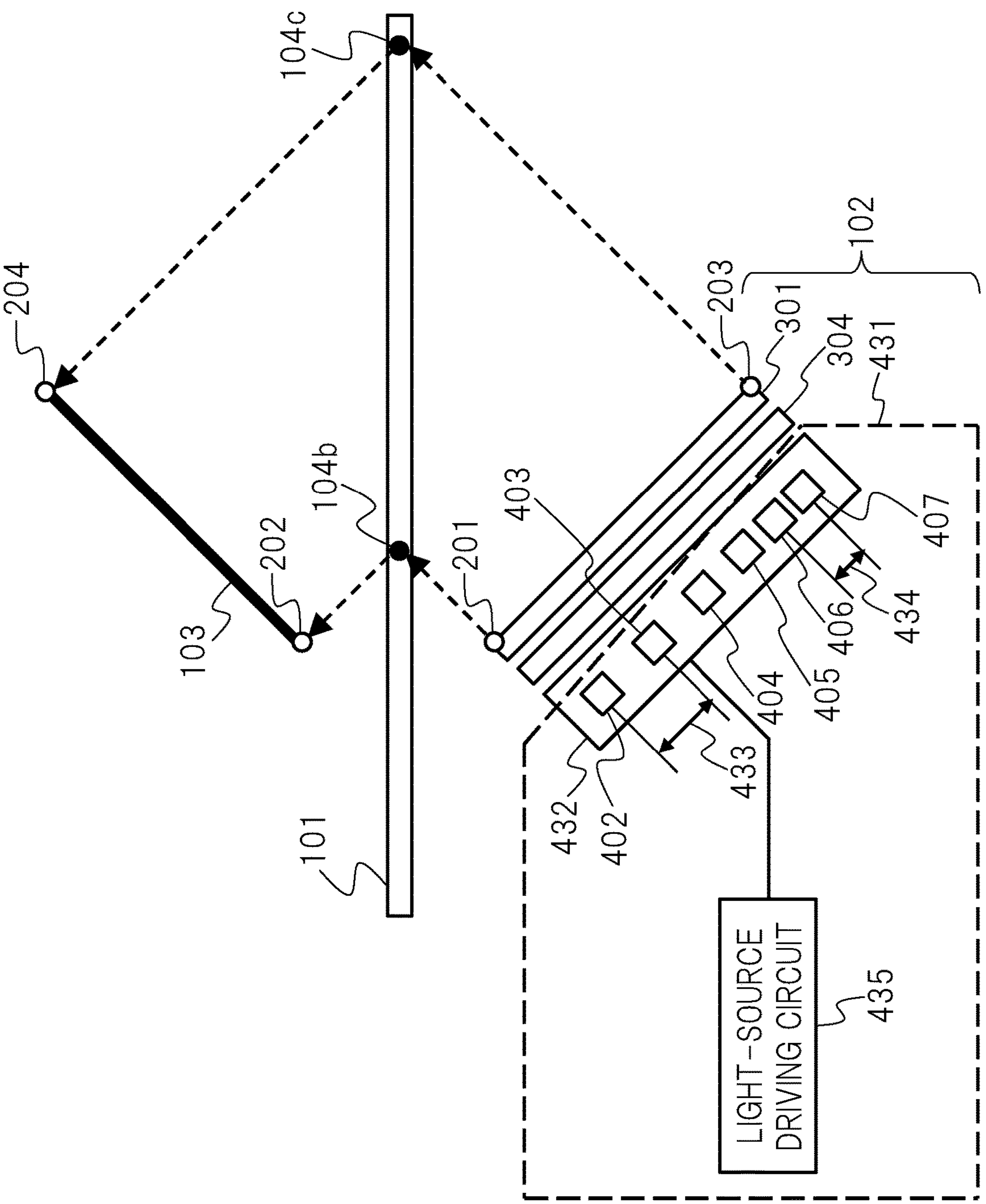
FIG. 6 is a diagram showing a configuration of a light source in a third example of the air floating video display apparatus according to the embodiment of the present invention.

FIG. 6 is a diagram showing a third example of the air floating video display apparatus according to the embodiment of the present invention. FIG. 6 is a diagram showing a configuration in the case of viewing in the direction of the arrow 106 of FIG. 1. The video display apparatus 102 is consist of the liquid crystal display panel 301, the diffusion plate 304 and a light source unit 431. The light source unit 431 may be also referred to as light source. The light source unit 431 is consist of a light-source optical unit 432 and a light-source driving circuit 435.

The light-source optical unit 432 of the light source unit 431 is consist of LED units 402, 403, 404, 405, 406 and 407, and each LED unit is driven in terms of constant current by the light-source driving circuit 435, and has the same light emission amount. Arrangement distances among the LED units are different from those of the example of FIG. 4. For example, if the arrangement distance between the LED units 402 and 403 is a distance 433 while the arrangement distance between the LED units 406 and 407 is a distance 434 as a premise, making the distance 434 smaller than the distance 433 can increase the light emission amount per unit area.

The light emission amount at the white circle position 203 can be increased, and the luminance decrease of the air floating image 103 at the white circle position 204 can be suppressed, and therefore, the luminance uniformity can be improved. In other words, the light path length of the video light having been emitted from the display surface of the video display through the retro-transmitting plate to the position of the air floating image changes depending on the position on the display surface of the video display from which the video light is emitted, a video display region of the display surface of the video display is quadrangular, the video display and the retro-transmitting plate are arranged to make gradient of the light path length of the video light at a position on the display surface of the video display in a first direction that is a direction along one side of the quadrangular shape, and the light source unit 431 is configured to change the light emission amount per unit area to make gradient in the direction corresponding to the first direction on the display surface of the video display.

Further, the light source unit 431 includes a plurality of light source elements 402 to 407, and the light source elements 402 to 407 are configured to change the arrangement distances among the light source elements 402 to 407 in a direction corresponding to the first direction on the display surface of the video display. In other words, the light source 431 includes the plurality of light emitting portions 402 to 407, and the light source 431 is configured to make gradient of the light emission amount per unit area in the direction corresponding to the first direction on the display surface of the display panel 301 by changing the arrangement distances among the plurality of light emitting portions.

Figure 7:
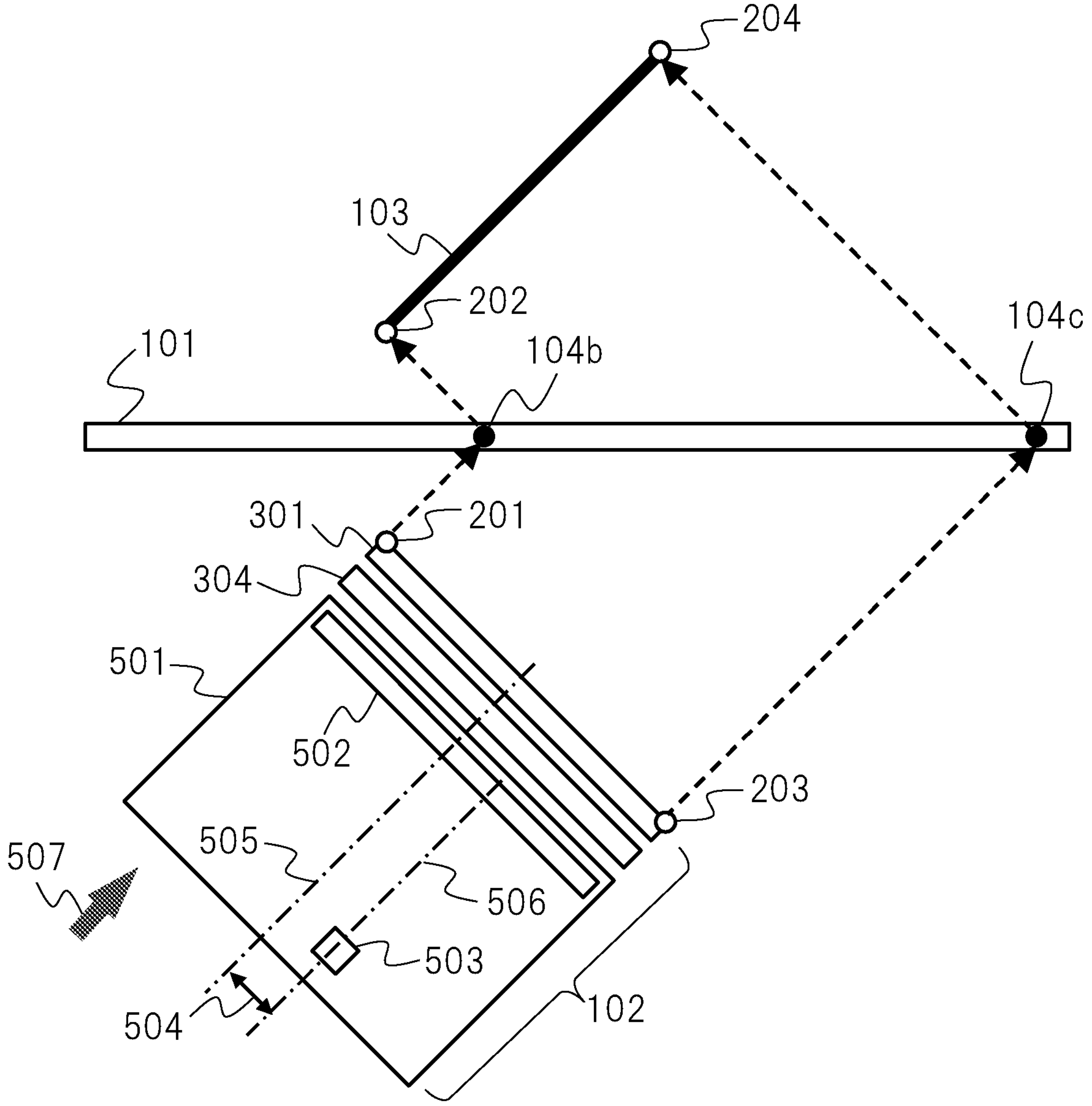
FIG. 7 is a diagram showing a configuration of a light source in a fourth example of the air floating video display apparatus according to the embodiment of the present invention.

FIG. 7 is a diagram showing a fourth example of the air floating video display apparatus according to the embodiment of the present invention. FIG. 7 is a diagram showing a configuration in the case of viewing in the direction of the arrow 106 of FIG. 1. The video display apparatus 102 is consist of the liquid crystal display panel 301, the diffusion plate 304 and a light source unit 501.

The light source unit 501 is consist of a Fresnel lens 502 and an LED unit 503, and the LED unit 503 is arranged at a position of focus of the Fresnel lens 502. A component including the light source 501, the Fresnel lens 502 and the diffusion plate 304 may be also referred to as backlight unit. Alternatively, the LED unit 503 may be also referred to as light source, and the Fresnel lens 502 may be also referred to as optical element. And, a normal-line plane passing a middle point between the white circle position 201 and the white circle position 203 is illustrated with a dotted line 505, and a normal-line plane that is center of the Fresnel lens 502 is illustrated with a dotted line 506. The normal line 506 is configured to shift by a distance 504 from the normal line 505 toward the white circle position 203. A diagram of this state viewed in a direction of an arrow 507 is illustrated as FIG. 8.

Figure 8:
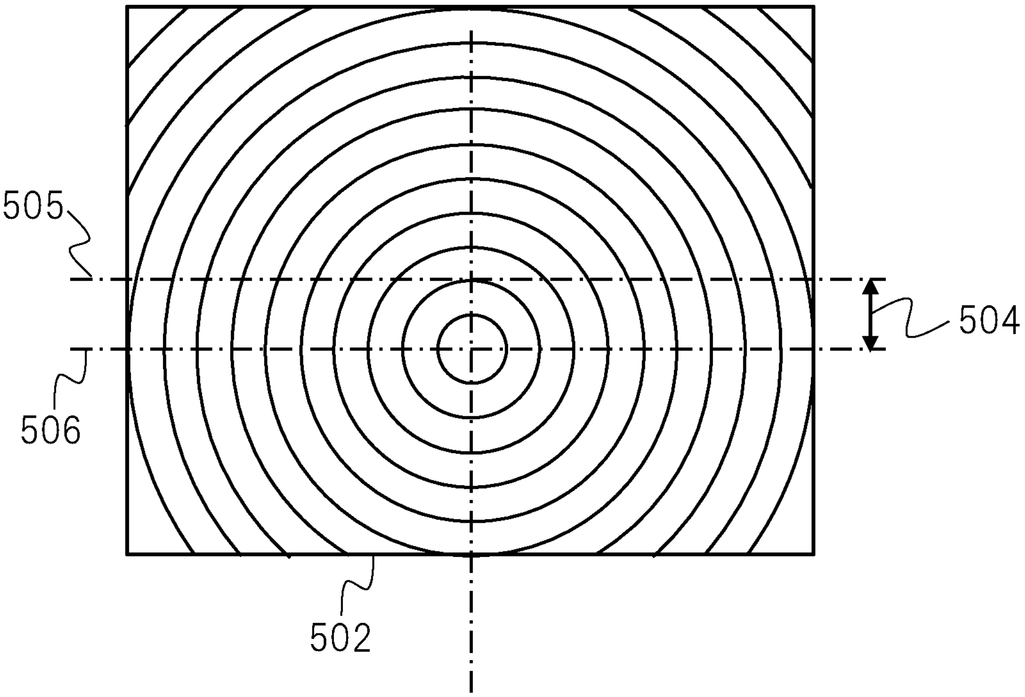
FIG. 8 is a diagram showing an optical element configuring the light source in the fourth example of the air floating video display apparatus according to the embodiment of the present invention.

FIG. 8 is a diagram showing an optical center position of the Fresnel lens 502, and the distance difference between the normal-line plane 505 and the normal-line plane 506 is the distance 504. The normal-line plane 506 is a plane including an optical axis of the Fresnel lens 502, and also the normal-line plane 506 is a normal-line plane extending from the LED unit 503 with respect to the Fresnel lens 502 plane. The light emitted from the LED unit 503 is diffusion light having Lambertian light distribution, but is changed by a light collection function of the Fresnel lens 502 to substantially collimated light in a direction toward the diffusion plate 304 that is the light emission direction. In this case, because of the shift by the distance 504, the light emission amount at the white circle position 203 is larger than the light emission amount at the white circle position 201, and the luminance decrease of the air floating image 103 at the white circle position 204 can be suppressed, and therefore, the luminance uniformity can be improved.

In other words, the apparatus includes the backlight unit including the light source 503, the Fresnel lens 502 and the diffusion plate 304, the display panel 301 and the retro-transmitting plate 101 transmitting the video light emitted from the display panel 301 to form the air floating video, the light path length of the video light having been emitted from the display surface of the display panel 301 through the retro-transmitting plate 101 to the position of the air floating image 103 changes depending on the position on the display surface of the display panel 301 from which the video light is emitted, and the optical axis of the Fresnel lens 502 shifts from the plane including the normal line extending from the light source 503 to the Fresnel lens 502 plane.

Further, a video display region of the display surface of the display panel 301 is quadrangular, the display panel 301 and the retro-transmitting plate 101 are arranged to make gradient of the light path length of the video light at a position on the display surface of the display panel 301 in a first direction that is a direction along one side of the quadrangular shape, and the backlight unit is configured to change a light emission amount per unit area to make gradient in the direction corresponding to the first direction on the display surface of the display panel 301 by shifting the optical axis of the Fresnel lens 502 from the plane including the normal line extending from the light source 503 toward the Fresnel lens 502 plane.

Figure 9:
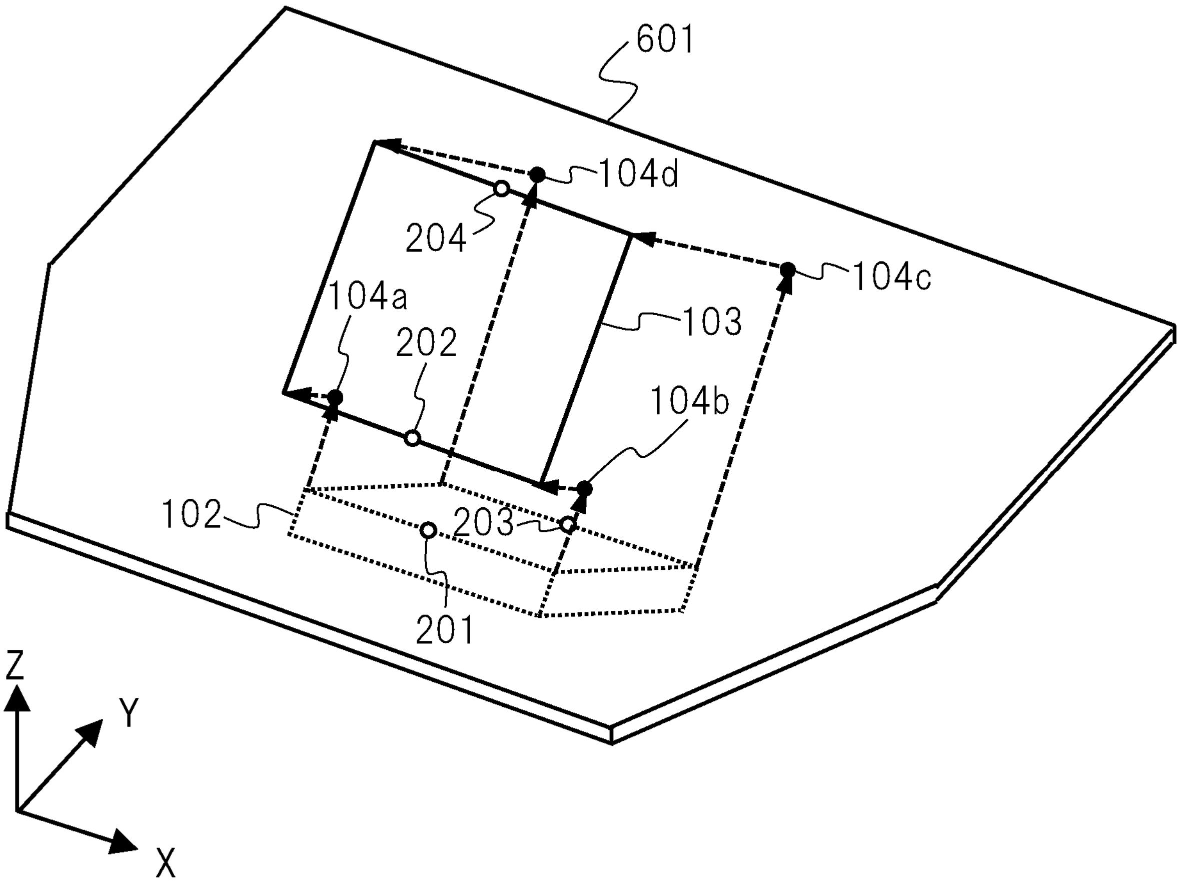
FIG. 9 is a diagram showing a configuration of a fifth example of the air floating video display apparatus according to the embodiment of the present invention.

FIG. 9 is a diagram showing a fifth example of the air floating video display apparatus according to the embodiment of the present invention. The air floating video display apparatus is consist of a trapezoidal double-layer type retro-transmitting optical plate 601 and a video display apparatus 102 to display the air floating image 103. The trapezoidal double-layer type retro-transmitting optical plate 601 may be also referred to as retro-transmitting plate, and the video display apparatus 102 may be also referred to as video display. The video display apparatus 102 is arranged on a back surface of the trapezoidal double-layer type retro-transmitting optical plate 601 to display the air floating image 103.

The video display apparatus 102 is arranged on a back surface of the trapezoidal double-layer type retro-transmitting optical plate 601, and each of points 104*a*, 104*b*, 104*c* and 104*d* is a middle point between each position of four corners of the video display apparatus 102 and an imaging position corresponding to each position of four corners of the formed air floating image 103, and is a point on a surface of the trapezoidal double-layer type retro-transmitting optical plate 601. Each of white circle positions 201 and 203 represents a light emission position of the video display apparatus 102, and each of white circle positions 202 and 204 represents an imaging position of the corresponding air floating image 103.

The trapezoidal double-layer type retro-transmitting optical plate 601 has a modified shape that is a shape with a width in a horizontal direction (that is an x direction shown in FIG. 9) gradually expanding from the point 104*b* toward the point 104*c*. As explained in FIG. 2, since the width of the double-layer type retro-transmitting optical plate 101 is expanded, difference between the divergence angle θ and the acceptance angle (taking-in angle) φ is small, and the loss of the emitted luminous flux from the white circle position 203 can be made small, and therefore, the luminance decrease of the air floating image 103 at the white circle position 204 can be suppressed, and the luminance uniformity can be improved.

In other words, the light path length of the video light having been emitted from the display surface of the video display through the retro-transmitting plate to the position of the air floating image changes depending on the position on the display surface of the video display from which the video light is emitted, a video display region of the display surface of the video display is quadrangular, the video display and the retro-transmitting plate are arranged to make gradient of the light path length of the video light at a position on the display surface of the video display in a first direction that is a direction along one side of the quadrangular shape, and the retro-transmitting plate is configured to change a dimension in a direction crossing at a right angle to the direction corresponding to the first direction on the display surface of the video display.

Therefore, as described above, the air floating video display apparatus includes the video display and the retro-transmitting plate transmitting the video light emitted from the video display to form the air floating video, the light path length of the video light having been emitted from the display surface of the video display through the retro-transmitting plate to the position of the air floating video changes depending on the position on the display surface of the video display from which the video light is emitted, and the video display is configured to change the light emission amount per unit area in accordance with the light path length. In other words, the light emission amount per unit area on the light emission surface of the backlight unit including the light source unit 303 and the diffusion plate 302, corresponding to the position of the display surface of the display panel, is changed depending on the light path length at the position of the display surface of the display panel.

In other words, the air floating video display apparatus for displaying the air floating video may be configured to include the optical element capable of adjusting the divergence angle of the light emitted from the video display in accordance with the light amount that can be taken into the light transmitting optical element and the video display position to substantially make the brightness viewed from the observer uniform.

In the present examples, the double-layer type retro-transmitting optical plate has been exemplified and explained as means for generating the air floating image. However, the means may be, for example, an optical plate consist of combination of a two-sided corner reflector array and a transparent resin material. Any means is applicable if the means is an optical plate having the same function.

In the technique according to the present examples, the video information is displayed in a state where the video information is floated in air, and, as a result, for example, the user can perform operations without concern about contact infection in illness by using combination with a contactless finger-position detecting apparatus or others. When the technique according to the present examples is applied to the system that is used by unspecified users, a contactless user interface having the less risk of the contact infection in illness and being available without the concern can be provided. The technique contributes to "the third goal: Good Health and Well-being (for all people)" of the Sustainable Development Goals (SDGs) advocated by the United Nations.

And, the technique according to the present examples can provide a uniformed bright air floating video. The technique according to the present examples can provide a contactless user interface being excellent in energy efficiency. The technique contributes to "the ninth goal: Industry, Innovation and Infrastructure" and "the eleventh goal: Sustainable Cities and Communities" of the Sustainable Development Goals (SDGs) advocated by the United Nations.

In the foregoing, various examples have been described in detail. However, the present invention is not limited to the foregoing examples, and includes various modification examples. For example, in the above-described examples, the entire system has been explained in detail for easily understanding the present invention, and the above-described examples are not always limited to the one including all structures explained above. Also, a part of the structure of one example can be replaced with the structure of another example, and besides, the structure of another example can be added to the structure of one example. Further, another structure can be added to/eliminated from/replaced with a part of the structure of each example.

What is claimed is:

1. An air floating video display apparatus comprising:

a video display; and a retro-transmitting plate transmitting video light emitted from the video display to form an air floating video, wherein the retro-transmitting plate includes a slit mirror array, wherein a light path length of video light having been emitted from a display surface of the video display through the retro-transmitting plate to a position of the air floating video changes depending on a position on the display surface of the video display from which the video light is emitted, and wherein the video display is configured to change a light emission amount per unit area to depend on the light path length.

2. The air floating video display apparatus according to claim 1, wherein a video display region of the display surface of the video display is quadrangular, wherein the video display and the retro-transmitting plate are arranged to make gradient of the light path length of the video light at a position on the display surface of the video display in a first direction that is a direction along one side of the quadrangular shape, and wherein the video display is configured to change the light emission amount per unit area to make gradient in a direction corresponding to the first direction on the display surface of the video display.

3. The air floating video display apparatus according to claim 1, wherein the video display is consist of a liquid crystal display panel, a diffusion plate and a light source unit, wherein a video display region of the display surface of the video display is quadrangular, wherein the video display and the retro-transmitting plate are arranged to make gradient of the light path length of the video light at a position on the display surface of the video display in a first direction that is a direction along one side of the quadrangular shape, and wherein a thickness of the diffusion plate is changed in a direction corresponding to the first direction on the display surface of the video display.

4. The air floating video display apparatus according to claim 1, wherein the video display is consist of a liquid crystal display panel, a diffusion plate and a light source unit, wherein a video display region of the display surface of the video display is quadrangular, wherein the video display and the retro-transmitting plate are arranged to make gradient of the light path length of the video light at a position on the display surface of the video display in a first direction that is a direction along one side of the quadrangular shape, and wherein the light source unit is configured to change the light emission amount per unit area to make gradient in a direction corresponding to the first direction on the display surface of the video display.

5. The air floating video display apparatus according to claim 4, wherein the light source unit includes a plurality of light source elements that are arranged at an equal interval, and wherein the light source elements are configured to change driving currents of the light source elements in the direction corresponding to the first direction on the display surface of the video display.

6. The air floating video display apparatus according to claim 4, wherein the light source unit includes a plurality of light source elements, and the light source elements are configured to change arrangement distances among the light source elements in the direction corresponding to the first direction on the display surface of the video display.

7. The air floating video display apparatus according to claim 1, wherein a video display region of the display surface of the video display is quadrangular, wherein the video display and the retro-transmitting plate are arranged to make gradient of the light path length of the video light at a position on the display surface of the video display in a first direction that is a direction along one side of the quadrangular shape, and wherein the retro-transmitting plate is configured to change a dimension in a direction crossing at a right angle to a direction corresponding to the first direction on the display surface of the video display.

* * * * *